T. H. BACON.
HARVESTER-RAKE.
No. 172,070.  Patented Jan. 11, 1876.
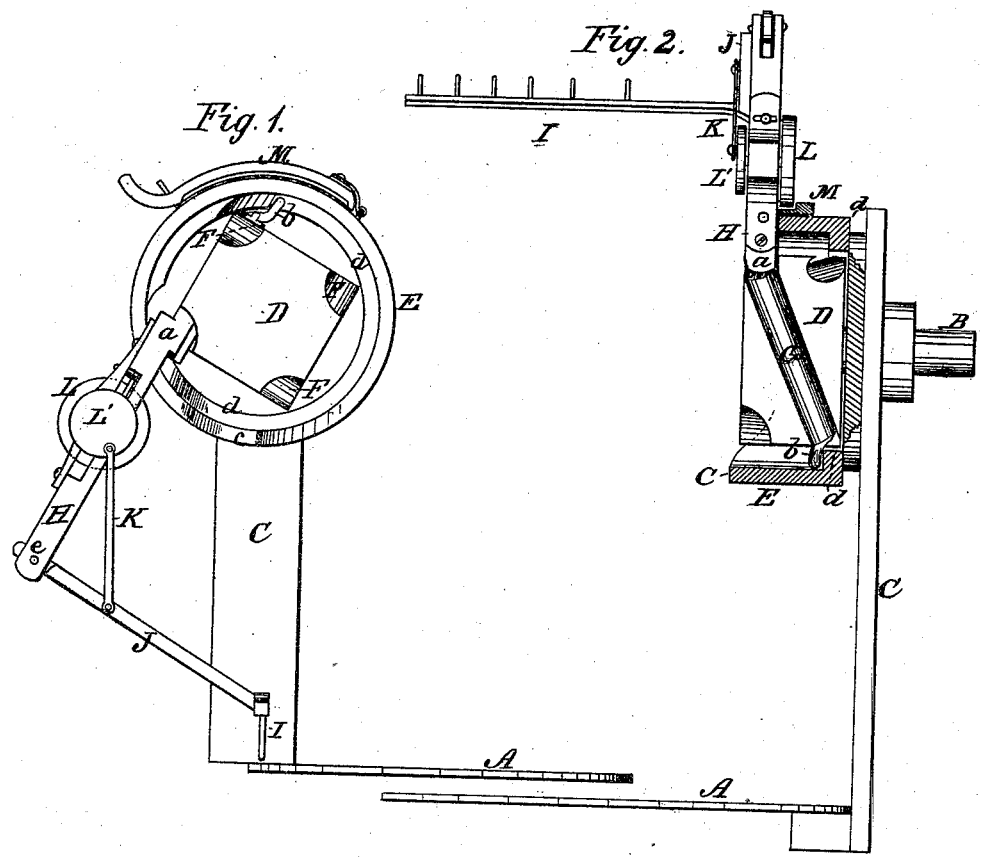
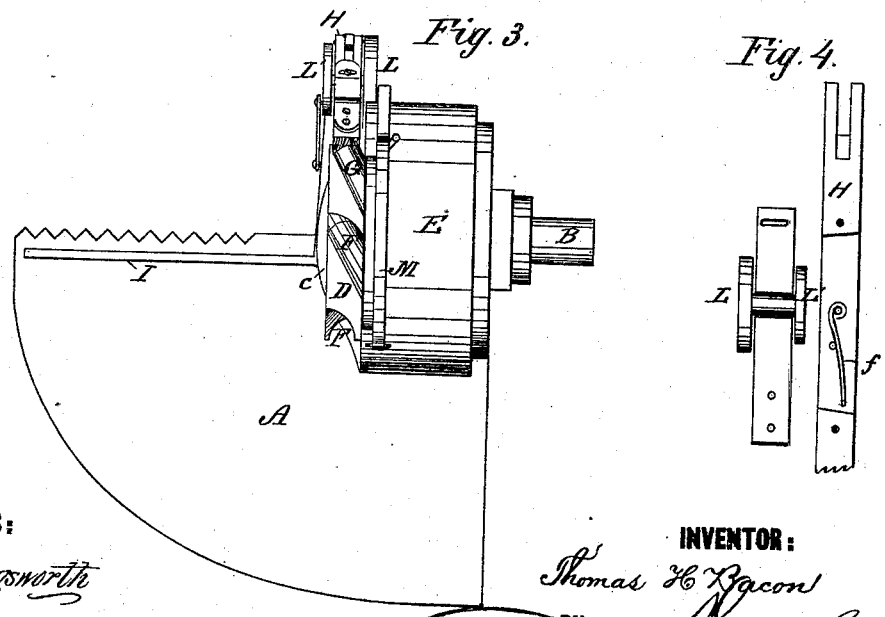
WITNESSES:
W. W. Hollingsworth
J. C. Kemon
INVENTOR:
Thomas H. Bacon
BY
ATTORNEYS.

UNITED STATES PATENT OFFICE.

THOMAS H. BACON, OF HANNIBAL, MISSOURI.

IMPROVEMENT IN HARVESTER-RAKES.

Specification forming part of Letters Patent No. 172,070, dated January 11, 1876; application filed October 4, 1875.

*To all whom it may concern:*

Be it known that I, THOMAS H. BACON, of Hannibal, in the county of Marion and State of Missouri, have invented a new and Improved Harvester Reel-Rake; and I do hereby declare that the following is a full, clear, and exact description of the same, reference being had to the accompanying drawing forming a part of this specification, in which—

Figure 1 is a side elevation, with the rake just entering upon the platform; Fig. 2, a rear elevation, showing the rake elevated and the cylindrical casing in section; Fig. 3, a plan view; Fig. 4, details of the devices for adjusting the rake, the bearings containing the wheels L L' being removed from the rake-arm and inverted.

This invention relates to certain improvements in harvester reel-rakes; and it consists in the particular construction and arrangement of the revolving reel-shaft and oscillating rake-arms, with cams for controlling the motion of the rake; and also in the construction of the devices for adjusting the rake, as hereinafter more fully described.

In the drawing, A represents the table or platform, which is in shape the quadrantal segment of an ellipse, with the sickle or cutter-bar upon the line of the major axis or conjugate diameter of the same. B is the reel-shaft, which is actuated by any suitable mechanism, and is journaled in bearings in the support C. The end of the reel-shaft terminates in or is attached to a boss or hub, D, which revolves inside a cylindrical casing, E. In the boss D are constructed bearings F, in which oscillate the axes of the rake-arms. Said bearings are arranged diagonally to the axis of the reel-shaft, and contain the axis G of the rake-arms H. Said rake-arms incline preferably to the reel-shaft at about sixty-seven degrees, and are attached to their own axis G at a slight inclination and in a different plane, so as to form a turn at *a*, which operates as a crank upon cam *c*, to oscillate axis G. To the other end of the rake-arm axis is attached a crank, *b*, which engages with a cam, *d*, inside the cylindrical casing E, to hold the rake-arm in place at all times except when the rake is upon the platform. I is the rake, which is attached to a right-angular arm, J, which latter is hinged or pivoted to the rake-arm at *e*, and held in place and adjusted, as to its height, by a pitman, K, through the following devices: L L' are two friction-wheels, which are fixed upon the same shaft and journaled in laterally-adjustable bearings upon the rake-arm. L' is provided with a wrist-pin, to which the pitman K is attached, the latter being held rigid by a spring, *f*, which causes said wheel L' to engage, with a frictional contact, with the side of the rake-arm. Upon the top of the cylinder E is hinged an adjusting-lever, M, which is provided with a way upon which wheel L may run, the said lever being made to conform to the shape of the cylinder. Now, if the rake is to be adjusted higher and farther away from the platform, as the rake-arm comes around in its revolution, the lever M is elevated by hand, so that when the wheel L passes upon the lever the lateral pressure of the frictional contact therewith overcomes the spring, and thereby releases the frictional contact of L' with the rake-arm, and the wheel L' is revolved, drawing pitman and rake inwardly and farther from the platform. To restore the rake to its former position it is only necessary to elevate the lever M again until the wheel L' has made a half-revolution, when the pitman and rake will be again projected farther out from the reel-shaft and nearer to the platform.

The operation of the working parts of the device is as follows: The rake-arm being in a vertical position, the crank *b* has entered upon the cam *d*, and holds said arm against the periphery of the cylindrical case E, so as to prevent any accidental oscillatory motion upon its axis. Motion being now imparted to the reel-shaft, the rake and its arm pass around in the same relative position until the rake is immediately above and parallel with the cutter-bar. At this stage of the revolution crank *b* passes off cam *d*, and the rake-arm passes upon the cam *c*. Now, the crank *b* being conformably free to move in a conformably-depressed portion of the cylindrical casing, and the attachment of rake-arm at *a* acting as a crank, its passage over cam *c* has the effect to oscillate the rake-arm through an arc of ninety degrees, which secondary rotation, in connection with the primary rotation, causes the rake to sweep with a smooth accelerated motion over the platform, from its position parallel with the cutter-bar, through the arc of an ellipse, to the side delivery, at right angles to the plane of the cutter-bar. As soon as the ascent of the rake commences rake-arm passes off cam $c$, and crank $b$ enters open cam $d$, again to hold the parts in position during the balance of the revolution.

Having thus described my invention, what I claim as new is—

1. The horizontal reel-shaft, having a boss or hub provided with diagonal bearings for the rake-arm axis, in combination with the double-cranked rake-arm axis and the cylindrical casing, having cams $c$ and $d$, as and for the purpose specified.

2. The combination, with the rake-arm H, of the rake I and arm J, pivoted to the said arm H at $e$, and provided with an adjusting-pitman, K, as and for the purpose described.

3. The combination, with the rake and rake-arm, of the pitman K, friction-wheels L L', spring $f$, and adjusting-lever M, substantially as described, and for the purpose set forth.

THOMAS H. BACON.

Witnesses:
HENRY G. BOURNE,
ORREY CARSTARPHEN.